(12) United States Patent
Choi et al.

(10) Patent No.: US 7,488,700 B2
(45) Date of Patent: Feb. 10, 2009

(54) HYDROTHERMALLY STABLE MICROPOROUS MOLECULAR SIEVE CATALYST AND PREPARATION METHOD THEREOF

(75) Inventors: Sun Choi, Daejeon (KR); Yong Seung Kim, Daejeon (KR); Deuk Soo Park, Gyeonggi-do (KR); Suk Joon Kim, Daejeon (KR); Il Mo Yang, Seoul (KR); Hee Young Kim, Daejeon (KR); Yong Ki Park, Daejeon (KR); Chul Wee Lee, Daejeon (KR); Won Choon Choi, Daejeon (KR); Kwang An Ko, Gwangju (KR); Na Young Kang, Chungcheongnam-do (KR)

(73) Assignees: SK Energy Co., Ltd., Seoul (KR); Korea Research Institute of Chemical Technology, Daejeon (KR)

( * ) Notice: Subject to any disclaimer, the term of this patent is extended or adjusted under 35 U.S.C. 154(b) by 44 days.

(21) Appl. No.: 11/427,001

(22) Filed: Jun. 28, 2006

(65) Prior Publication Data
US 2007/0082809 A1    Apr. 12, 2007

(30) Foreign Application Priority Data
Oct. 7, 2005  (KR) .................... 10-2005-0094466
Jun. 13, 2006 (KR) .................... 10-2006-0053068

(51) Int. Cl.
*B01J 29/06*  (2006.01)
*B01J 27/16*  (2006.01)
*B01J 27/18*  (2006.01)
*B01J 27/182* (2006.01)

(52) U.S. Cl. .................... 502/208; 502/214; 502/60; 502/77; 502/78; 502/79
(58) Field of Classification Search ................ 502/208, 502/214, 60, 77, 78, 79
See application file for complete search history.

(56) References Cited

U.S. PATENT DOCUMENTS

| 3,911,041 | A  | * | 10/1975 | Kaeding et al. ........... 585/711 |
| 4,677,122 | A  |   | 6/1987  | Horwell et al. |
| 6,211,104 | B1 |   | 4/2001  | Shi et al. |
| 6,835,863 | B2 |   | 12/2004 | Chester et al. |
| 6,867,341 | B1 |   | 3/2005  | Abrevaya et al. |
| 2003/0027713 | A1 | * | 2/2003 | O'Connor et al. ........... 502/64 |

* cited by examiner

*Primary Examiner*—Elizabeth D Wood
(74) *Attorney, Agent, or Firm*—Darby & Darby P.C.

(57) ABSTRACT

Disclosed are a hydrothermally stable porous molecular sieve catalyst and a preparation method thereof. The catalyst consists of a product obtained by the evaporation of water from a raw material mixture comprising a molecular sieve having a framework of Si—OH—Al—, a water-insoluble metal salt and a phosphate compound. The catalyst maintains its physical and chemical stabilities even in an atmosphere of high temperature and humidity. Accordingly, the catalyst shows excellent catalytic activity even when it is used in a severe process environment of high temperature and humidity in heterogeneous catalytic reactions, such as various oxidation/reduction reactions, including catalytic cracking reactions, isomerization reactions, alkylation reactions and esterification reactions.

20 Claims, 4 Drawing Sheets

FIGURES

HYDROTHERMALLY STABLE MICROPOROUS MOLECULAR SIEVE CATALYST AND PREPARATION METHOD THEREOF

BACKGROUND OF THE INVENTION

1. Field of the Invention

The present invention relates to a hydrothermally stable porous molecular sieve catalyst and a preparation method thereof, and more particularly to a hydrothermally stable porous molecular sieve catalyst, which, even in an atmosphere of high temperature and humidity, has a relatively stable structure and can maintain its catalytic activity, as well as a preparation method thereof.

2. Description of the Related Art

Porous inorganic materials having a framework of —Si—OH—Al— groups have been widely used in the field of porous molecular sieve catalysts because they have abundant pores, large specific surface area, and many active sites and acid sites.

This porous molecular sieve catalyst is used in, for example, heterogeneous catalytic reactions, such as various oxidation/reduction reactions, including catalytic cracking reactions, isomerization reactions and esterification reactions, particularly heterogeneous catalytic reactions requiring thermal stability under a severe atmosphere of high temperature and humidity. In this case, however, the catalyst has problems in that, when it is placed in a steam atmosphere of more than 500° C., dealumination of its tetrahedral framework will occur, leading to its structural breakdown, and at the same time, the acid sites of the catalyst will be reduced, resulting in a rapid reduction in catalytic activity.

Accordingly, in order to reduce the deactivation of the porous molecular sieve catalyst, which will occur when the catalyst is placed in a severe process atmosphere of high temperature and humidity, methods for modifying a porous solid acid with a phosphate compound and/or a specific metal have been attempted in the prior art.

Regarding these methods, U.S. Pat. No. 4,977,122 discloses a hydrothermally stable catalyst, which comprises: (a) a crystalline zeolite; (b) an inorganic oxide matrix (e.g., silica, alumina, silica-alumina, magnesia, zirconia, titania, boria, chromia, clay, etc.); and (c) phosphorus-containing alumina prepared by contacting alumina with an alkaline earth metal (Be, Mg, Ca, Sr, Ba) salt of phosphoric salt or of phosphorous salt, in which the zeolite is a zeolite USY present in an amount of 1-70 wt %, and the phosphorus-containing alumina is present in an amount of 5-50 wt %, said phosphorus being present in an amount of 0.5-5.0 wt % based on the amount of alumina.

U.S. Pat. No. 6,867,341 discloses a naphtha cracking catalyst obtained by adjusting the distribution of aluminum atoms in zeolite and crystal size of zeolite, as well as a process for cracking naphtha using this catalyst. This catalyst is designed and prepared so that the production of aromatic compounds on the pore surface can be minimized by chemically neutralizing aluminum present outside the pores, whereas ethylene and propylene having small sizes, can be more selectively produced by increasing the concentration of aluminum ions inside the pores to increase the number of acid sites. According to said patent, Al-NMR spectra are presented which indicate that a ferrierite zeolite catalyst obtained by this technology maintains the tetrahedral Al framework intact even when it is placed in an atmosphere of 50% steam at 690° C. for 2 hours. However, it is expected that the hydrothermal stability and structural stability of the catalyst cannot be secured when it is treated with 100% steam at 750° C. for 24 hours.

U.S. Pat. No. 6,835,863 discloses a process for producing light olefins by catalytically cracking naphtha (boiling point: 27-221° C.) using a pelletized catalyst containing 5-75% by weight of ZSM-5 and/or ZSM-11, 25-95% by weight of silica or kaolin and 0.5-10% by weight of phosphorus. However, there is no mention of the specific phosphorus starting material or of the hydrothermal stability of the molded catalyst.

Meanwhile, U.S. Pat. No. 6,211,104 discloses a catalyst for catalytic cracking, which comprises 10-70 wt % of clay, 5-85 wt % of inorganic oxides and 1-50 wt % of zeolite. The zeolite used in the catalyst consists of 0-25 wt % of Y-zeolite or REY-zeolite and 75-100 wt % of pentasil zeolite ($SiO_2/Al_2O_3$=15-60; selected from ZSM-5, ZSM-8 and ZSM-11 zeolites containing 2-8 wt % of $P_2O_5$ and 0.3-3 wt % of $Al_2O_3$ or MgO or CaO), in which the starting materials of said aluminum or magnesium or calcium compounds are selected from aqueous solutions of their nitrates, hydrochloride, or sulfates. Particularly, the catalyst is described as showing excellent olefin production even when pretreated in an atmosphere of 100% steam at 800° C. for 4-27 hours. However, in said patent, technology for adjusting/selecting and loading the specific chemical species of P is not disclosed, the added metals are limited to Al, Mg and Ca, and a conventional water-soluble metal salt is used so that the Al, Mg or Ca cations, which are generated during the preparation of the catalyst, can be easily ion-exchanged with the protons of zeolite, resulting in the loss of acidic sites. For this reason, it is believed that it is not easy to prepare the catalyst proposed in said patent under the specified synthesis conditions.

In the prior method of modifying the porous solid acid with a phosphate compound and/or a specific metal as described above, particularly in the case of modifying the porous support with a phosphate ion, the —Si—OH—Al— moiety acting as a Bronsted acid site in zeolite is modified with a phosphate ion ($[PO_4]^{3-}$), as shown in the following formula, so that the =P=O group stabilizes unstable Al to minimize dealumination. However, because the phosphate ion is relatively high in acidity, it has the ability to modify non-selectively various acid sites having different acidities in zeolite during a modification reaction using phosphate. Accordingly, in this case, it is not easy to modify acid sites.

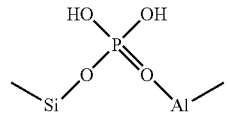

Another method can be exemplified by a method of modifying zeolite with rare-earth metals, such as La, and phosphate ions. In this case, because $La^{3+}$ ions having high oxidation number, or phosphate ions are larger in size than the zeolite pores, the pore surface of zeolite is modified with these ions in general modification procedure during synthesis.

Meanwhile, it is expected that steam existing at high temperature will attack the —Si—OH—Al— moieties present on the surface rather than inside of the zeolite pores so that the dealumination of the —Si—OH—Al— moieties will occur slowly to break their structure. To overcome this problem, if zeolite is loaded with a rare-earth metal, the metal will be placed mainly on the pore surface, and thus, the —Si—OH—Al— moieties can be protected from high-temperature steam, resulting in an improvement in hydrothermal stability.

However, if a conventional water-soluble salt is used as a salt of the metal, large amounts of metal cations, which are generated during the preparation of a catalyst, can be easily ion-exchanged with the protons of zeolite, resulting in the loss of acid sites. Thus, in this case, there is a problem in that the dissolved metal ions are ion-exchanged with the protons of the molecular sieve to reduce the number of acid sites, leading to a reduction in catalytic performance.

Accordingly, there is a continued need for the development of a catalyst which: (1) has a stable structure even in an atmosphere of high temperature and humidity; (2) is modified selectively only at its pore surface while maintaining the fundamental framework structure of the solid acid of the porous molecular sieve; and (3) can maintain its activity over a long period of time even in an atmosphere of high temperature and humidity.

SUMMARY OF THE INVENTION

Accordingly, the present inventors have conducted extensive studies to develop a catalyst that has excellent hydrothermal stability compared to a porous molecular sieve catalyst known in the prior art, is prepared in a simple manner, and can maintain its activity over a long period of time even in a severe process environment, and as a result, found that if a phosphate compound and an insoluble metal salt were used so that only exposed acid sites outside the pores of a porous molecular sieve were modified with hydrothermally stable phosphate ions which in turn were stabilized with metal ions, a porous molecular sieve catalyst could be obtained which shows excellent hydrothermal stability, even in an atmosphere of high temperature and humidity. On the basis of this fact, the present invention has been completed.

Therefore, it is an object of the present invention to provide a porous molecular sieve catalyst which maintains its physical and chemical stabilities even when it is placed in an atmosphere of high temperature and humidity during its use in heterogeneous catalytic reactions, such as various oxidation/reduction reactions, including catalytic cracking reactions, isomerization reactions, alkylation reactions and esterification reactions, as well as a preparation method thereof.

Another object of the present invention is to provide a porous molecular sieve catalyst which is modified selectively only at its pore surface while maintaining its fundamental framework structure so that it maintains a stable structure over a long period of time even in an atmosphere of high temperature and humidity, as well as a preparation method thereof.

Still another object of the present invention is to provide a porous molecular sieve catalyst which is prepared by a simple process, leading to easy mass production and increased economic efficiency, as well as a preparation method thereof.

To achieve the above objects, the present invention provides a hydrothermally stable porous molecular sieve catalyst, which consists of a product obtained by the evaporation of water from a raw material mixture comprising 100 parts by weight of a molecular sieve having a framework of —Si—OH—Al—, 0.01-5.0 parts by weight of a water-insoluble metal salt, and 0.05-17.0 parts by weight of a phosphate compound, in which the surface pores of the molecular sieve are modified with one of the compounds represented by the following formulas 1 to 3:

[Formula 1]
$M_x(H_2PO_4)_y$, wherein M is a metal, x is 1, and y is an integer from 2 to 6;

[Formula 2]
$M_x(HPO_4)_y$, wherein M is a metal, x is 2, and y is an integer from 2 to 6; and

[Formula 3]
$M_x(PO_4)_y$, wherein M is a metal, x is 3, and y is an integer from 2 to 6.

In the present invention, the molar ratio of the water-insoluble metal salt to the phosphate compound is preferably 1.0:0.3-10.0.

Meanwhile, the molecular sieve is a preferably a zeolite having a Si/Al molar ratio of 1-300 and a pore size of 4-10 Å, or a mesoporous molecular sieve having a pore size of 10-100 Å. More preferably, the molecular sieve is selected from the group consisting of ZSM-5, ferrierite, ZSM-11, mordenite, beta-zeolite, MCM-22, L-zeolite, MCM-41, SBA-15 and Y-zeolite.

The water-insoluble metal salt is preferably an oxide, hydroxide, carbonate or oxalate of at least one metal selected from the group consisting of alkaline earth metals, transition metals, and heavy metals with an acid value of +3 to +5.

The phosphate compound is preferably phosphoric acid ($H_3PO_4$), ammonium phosphate, or alkyl phosphate.

According to one preferred embodiment, the present invention provides a method for preparing a hydrothermally stable porous molecular sieve catalyst, the method comprising the steps of: (a) adding a molecular sieve having a framework of —Si—OH—Al— to an aqueous slurry containing a phosphate compound and a water-soluble metal salt, in such a manner that the aqueous slurry has a raw material composition comprising 100 parts by weight of the molecular sieve, 0.01-5.0 parts by weight of the water-insoluble metal salt and 0.05-17.0 parts by weight of the phosphate compound; and (b) removing water from the aqueous slurry by an evaporation process, followed by filtration to recover the solid product.

In the inventive method, step (a) may comprise the substeps of: (i) mixing the phosphate compound, the water-insoluble salt and water with each other to prepare an aqueous slurry; (ii) adjusting the pH of the slurry such that the phosphate compound in the slurry is present in the form of an ion selected from a monohydrogen phosphate ion ($[HPO_4]^{2-}$), a dihydrogen phosphate ion ($[H_2PO_4]^-$) and a phosphate ion ($[PO_4]^{3-}$), and stirring the slurry; and (iii) adding the molecular sieve having a framework of —Si—OH—Al— to the slurry of step (ii).

The stirring in step (ii) can be carried out at a temperature of 20-60° C. for a period ranging from 30 minutes to 3 hours.

Also, the evaporation process in step (b) can be carried out at a temperature of 10-90° C.

According to another preferred embodiment, the present invention provides a method for preparing a hydrothermally stable porous molecular sieve catalyst, the method comprising the steps of: (a) preparing an aqueous slurry containing a phosphate compound and a water-insoluble metal salt; (b) removing water from the aqueous slurry by a first evaporation process, followed by filtration to recover a first solid product; (c) preparing an aqueous solution containing a molecular sieve having a framework of —Si—OH—Al—; and (d) adding the first solid product to the molecular sieve-containing aqueous solution, and removing water from the mixture solution by a second evaporation process, followed by filtration to separate a second solid product; in which the phosphate compound and the water-insoluble metal salt are used in amounts of 0.05-17.0 parts by weight and 0.01-5.0 parts by weight, respectively, based on 100 parts by weight of the molecular sieve.

In this embodiment, step (a) may comprise the sub-steps of: (i) mixing the phosphate compound, the water-insoluble metal salt and water with each other; and (ii) adjusting the pH of the mixture such that the phosphate compound in the mixture is present in the form of an ion selected from a monohydrogen phosphate ion, a dihydrogen phosphate ion and a phosphate ion, and stirring the mixture.

The first solid product may be added in an amount of 0.01-20.0 parts by weight based on 100 parts by weight of the molecular sieve.

The mixing in step (ii) can be carried out at a temperature of 20-60° C. for a period ranging from 30 minutes to 3 hours.

Also, the first evaporation process is preferably carried out at a temperature of 10-90° C., and the second evaporation process is preferably carried out at a temperature of 20-60° C.

BRIEF DESCRIPTION OF THE DRAWING

The above and other objects, features and advantages of the present invention will be more clearly understood from the following detailed description taken in conjunction with the accompanying drawing, in which.

DESCRIPTION OF THE PREFERRED EMBODIMENTS

Figure 1A:
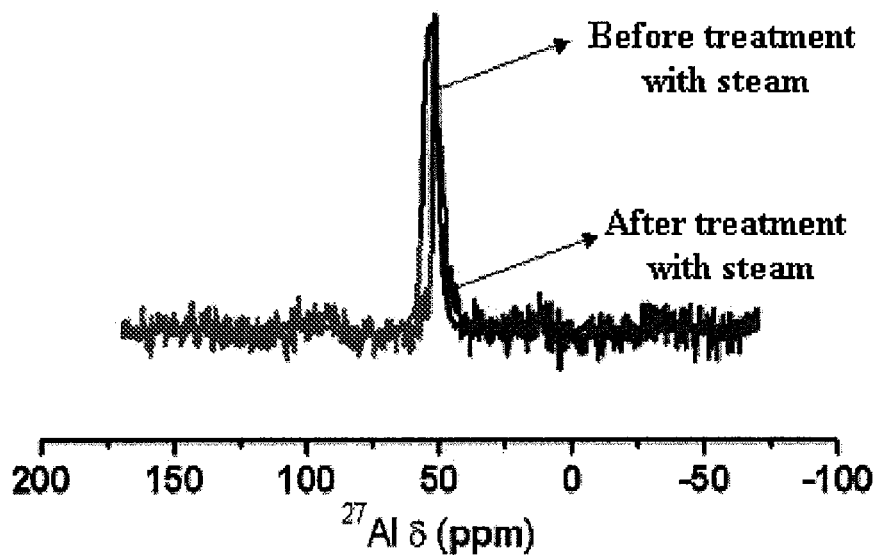
FIGS. 1A to 1C are graphic diagrams showing the results of $^{27}Al$ NMR spectra for catalysts prepared in Example of the present invention and Comparative Examples.

Hereinafter, the present invention will be described in more detail.

As described above, the porous molecular sieve catalyst according to the present invention consists of a product obtained by the water evaporation of a raw material mixture comprising 100 parts by weight of a molecular sieve having a framework of —Si—OH—Al—, 0.01-5.0 parts by weight of a water-insoluble metal salt, and 0.05-17.0 parts by weight of a phosphate compound. When the catalyst is used in a severe environment of high temperature and humidity in heterogeneous catalytic reactions, such as various oxidation/reduction reactions, including catalytic cracking reactions, isomerization reactions and esterification reactions, it can show excellent hydrothermal stability, reaction activity and reaction selectivity while increasing economic efficiency. The inventive catalyst can be prepared to have the desired physical and chemical properties by suitably selecting and adjusting the kind of starting material for a modifier, the composition of each component, the loading amount, pH and temperature of the solution during loading, etc. During the catalyst preparation process, the following technical particulars are considered:

(1) technology for selectively modifying only the surface pores of a molecular sieve with a phosphate compound which is present in the form of an ion selected from a monohydrogen phosphate ion, a dihydrogen phosphate ion, and a phosphate ion;

(2) technology for using a water-insoluble metal salt to prevent the ion exchange of protons in the molecular sieve with a large amount of dissolved metal ions and at the same time, to stabilize a phosphate compound modifying the molecular sieve; and (3) technology for stabilizing a molecular sieve modified with a phosphate compound and a metal by water evaporation.

Under this technical framework, any support for the catalyst may be used if it is a molecular sieve having a framework of —Si—OH—Al— groups.

It is preferable to use any one selected from mesoporous molecular sieves having a pore size of 10-100 Å and an Si/Al molar ratio of 1-300, and preferably about 25-80, including zeolites having a pore size of 4-10 Å.

Among them, more preferred are ZSM-5, Ferrierite, ZSM-11, Mordenite, Beta-zeolite, MCM-22, L-zeolite, MCM-41, SBA-15 and/or Y-zeolite, the general properties of which are already widely known in the art.

As used herein, the term "water-insoluble metal salt" means a metal salt with a solubility product ($K_{sp}$) of less than $10^{-4}$, i.e., a $pK_{sp}$ of more than 4. An example of this metal salt may be an oxide, hydroxide, carbonate or oxalate of a metal with an oxidation state of more than +2. Preferably, the metal salt is an oxide, hydroxide, carbonate or oxalate of at least one metal selected from the group consisting of alkaline earth metals, transition metals, and heavy metals having an oxidation state of +3 to +5.

Preferably, the alkaline earth metals may include Mg, Ca, Sr and Ba, the transition metals may include Ti, V, Cr, Mn, Fe, Co, Ni and Cu, and the heavy metals may include B, Al, Ga, In, Ti, Sn, Pb, Sb and Bi.

Meanwhile, the phosphate compound is not specifically limited if it is one known in the art. However, because the use of phosphoric acid as the phosphate compound has a disadvantage in that the crystallinity of a porous material is reduced, alkyl phosphine derivatives in place of phosphoric acid may also be used but have a problem in that they are not suitable for use in mass production because they are uneconomical and not easy to handle. For this reason, it is preferable to use phosphoric acid ($H_3PO_4$), ammonium phosphate [$(NH4)_3PO_4$, $(NH_4)_2HPO_4$, $(NH_4)H_2PO_4$], or alkyl phosphate as the phosphate compound.

It is generally known that the acid dissociation constants pKa(1), pKa(2) and pKa(3) of phosphoric acid ($H_3PO_4$) are 2.2, 7.2 and 12.3, respectively, and the phosphoric acid is present as a monohydrogen phosphate ion ($[HPO_4]^{2-}$), a dihydrogen phosphate ion ($[H_2PO_4]^-$) and a phosphate ion ($[PO_4]^{3-}$) at pHs 2.2, 7.2 and 12.3, respectively. Thus, it will be obvious that the desired chemical species of phosphate ions can be selectively formed by suitably adjusting the pH of an aqueous solution containing the phosphate compound.

The porous molecular sieve catalyst formed from the above-described composition is modified with one compound selected from compounds represented by the following formulas 1 to 3:

[Formula 1]

$M_x(H_2PO_4)_y$, wherein M is a metal, x is 1, and y is an integer from 2 to 6;

[Formula 2]

$M_x(HPO_4)_y$, wherein M is a metal, x is 2, and y is an integer from 2 to 6; and

[Formula 3]

$M_x(PO_4)_y$, wherein M is a metal, x is 3, and y is an integer from 2 to 6.

Accordingly, exposed acid sites outside the pores of the porous molecular sieve are selectively modified with a modifier which has physical and chemical stabilities in an atmosphere of high temperature and humidity, so that the surface of zeolite can be protected from dealumination.

Although the description for the preparation of the molecular sieve catalyst is not restricted to a certain theory, it is believed that the —Si—OH—Al— groups forming the molecular sieve are modified with the phosphate compound/metal composite structure, as shown in the following reaction schemes 1 and 2, so as to be condensed with the proton of zeolite, so that the =P=O group stabilizes unstable Al while two —OH groups are stabilized with the metal, whereby the framework structure is relatively stably maintained even in an atmosphere of high temperature and humidity:

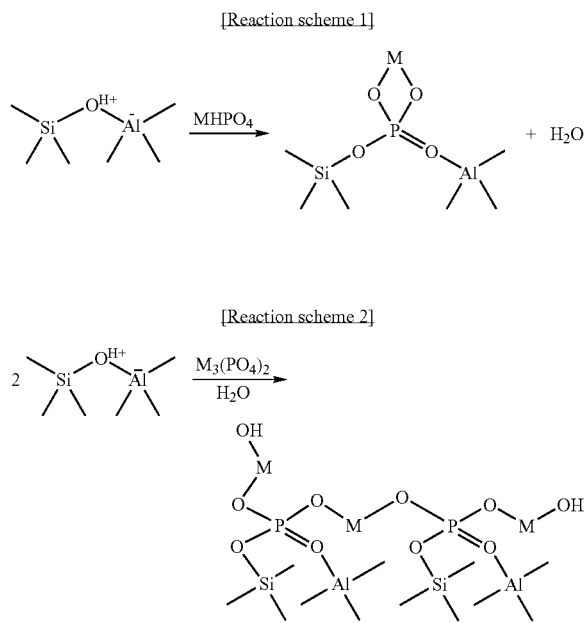

The methods for preparing the catalyst according to the present invention can be broadly divided into two methods, which involve the step of removing water contained in the above-described raw material mixture by a selective evaporation process so as to collect a solid product.

Hereinafter, the preparation method of the catalyst according to one preferred embodiment of the present invention will be described.

(1) A phosphate compound is added to and mixed with an aqueous slurry containing the water-insoluble metal salt. The mixture is adjusted to a suitable pH using a conventional alkaline or acidic aqueous solution, such as NaOH, KOH, $NH_4OH$, HCl or $HNO_3$, and stirred at a temperature of about 20-60° C. and preferably about 40-50° C., for a period ranging from about 30 minutes to about 3 hours and preferably about 1-3 hours, so that the phosphate compound is present in the form of an ion selected from a monohydrogen phosphate ion, a dihydrogen phosphate ion and a phosphate ion, in the aqueous solution.

Particularly, it is preferable that the mixture is adjusted within a desired pH range so that only one chemical species of phosphate ion that exists in this pH range will be formed in the aqueous solution. Namely, if a specific pH range is not met, one or more species of phosphate ions will coexist in the aqueous solution, so that the chemical species modifying the pore surface of the molecular sieve will not be uniform, thus making it difficult to secure the durability of the modified catalyst.

(2) To the mixture of the part (1), a molecular sieve having a framework of —Si—OH—Al— groups is added. The resulting mixture is stirred at a temperature of preferably about 10-90° C., and more preferably about 50-70° C., in a specific pH range corresponding to the purpose, until water in the aqueous slurry is completely evaporated. Thus, the phosphate ion species modifying the molecular sieve is stabilized with metal ions while water present in the slurry is removed. Then, vacuum filtration is performed to collect the solid product. In this way, the molecular sieve catalyst having the —Si—OH—Al— framework modified with the phosphate-metal salt is prepared.

Meanwhile, the composition of the raw material mixture used in the preparation of the catalyst is as follows: 100 parts by weight of the molecular sieve with the —Si—OH—Al— framework; 0.01-5.0 parts by weight of the water-insoluble metal salt; and 0.05-17.0 parts by weight of the phosphate compound.

The preparation method of the catalyst according to another embodiment of the present invention will now be described.

(1) A phosphate compound is added to and mixed with an aqueous slurry containing the water-insoluble metal salt. The mixture is adjusted to a suitable pH using a conventional alkaline or acidic aqueous solution, such as NaOH, KOH, $NH_4OH$, HCl or $HNO_3$, and stirred at a temperature of about 20-60° C., and preferably about 40-50° C., for a period ranging from about 30 minutes to about 3 hours, and preferably about 1-3 hours, so that the phosphate compound exists in the form of an ion selected from a monohydrogen phosphate ion, a dihydrogen phosphate ion and a phosphate ion, in the aqueous solution. Then, the aqueous slurry is subjected to water evaporation at a temperature of preferably 10-90° C., and more preferably 50-70° C., in a specific pH range corresponding to the purpose, until the water in the aqueous slurry is completely evaporated. Then, the remaining solid product is vacuum filtered and washed to separate a first solid product. In this way, the water-insoluble phosphate-metal salt is prepared.

(2) The first solid product of the part (1) is added to and mixed with an aqueous solution containing a molecular sieve having a framework of —Si—OH—Al— groups. The resulting mixture is stirred at a temperature of preferably about 20-60° C., and more preferably about 40-50° C., for a period ranging from about 30 minutes to about 7 hours, and preferably about 1-5 hours, until the water in the mixture is completely evaporated. Then, the remaining solid product is vacuum filtered to separate a second solid product. In this way, the molecular sieve catalyst having the —Si—OH—Al— framework modified with the phosphate-metal salt is prepared.

Meanwhile, the raw material mixture used in the preparation of the catalyst is used in a controlled manner such that the composition of the raw material mixture is as follows: 100 parts by weight of the molecular sieve having the —Si—OH—Al— framework; 0.01-5.0 parts by weight of the water-insoluble metal salt; and 0.05-17.0 parts by weight of the phosphate compound. Particularly, it is preferable in terms of the desired effect that the first solid product be used in an amount of 0.01-20.0 parts by weight based on 100 parts by weight of the molecular sieve.

In the above-described methods of preparing the catalyst, it is necessary to find conditions where the metal ions formed by the dissolution of some of the metal salt in the aqueous solution can stabilize only the modified phosphate ion species without ion exchange with the proton of the molecular sieve. Otherwise the dissolved metal ions will be ion-exchanged with the proton of the molecular sieve to reduce the number of acid sites, resulting in a reduction in reactivity of modified catalyst.

For this reason, as described above, the present invention utilizes a water-insoluble metal salt having a solubility product of less than $10^{-4}$ in aqueous solution, and preferably, an oxide, hydroxide, carbonate or oxalate of at least one metal selected from the group consisting of alkaline earth metals, transition metals, and heavy metals having an oxidation state from +3 to +5. By the use of such a water-insoluble metal salt, it is possible to substantially prevent the phenomenon of ion exchange with the proton of the molecular sieve by the presence of a large amount of metal ions, which is a problem in the case of using water-soluble metal salts, and at the same time, it is possible to maximize the effect of stabilizing the modified phosphate ions with the desired metal ions.

Meanwhile, the raw material mixture in the aqueous slurry for the preparation of the catalyst must be maintained at the following composition: 100 parts by weight of the molecular sieve; 0.01-5.0 parts by weight of the water-insoluble metal salt; and 0.05-17.0 parts by weight of the phosphate compound. If the composition of the raw material mixture is out of the specified composition range, the surface pores of the molecular sieve will not be selectively modified with the modifier given in the present invention, and the number of acid sites will be somewhat reduced, leading to a reduction in catalytic activity. Particularly, the molar ratio of the water-insoluble metal salt to the phosphate compound is 1.0:0.3-10.0, and preferably 1.0:0.7-5.0. If the molar ratio of the water-insoluble metal salt to the phosphate compound is less than 1:0.3, there is a problem in that unnecessary metal ions are present in excess so that the number of acid sites in the molecular sieve is reduced, leading to a reduction in the reactivity of the modified catalyst. On the other hand, if the molar ratio of the water-insoluble metal salt to the phosphate compound is more than 1:10.0, there is a problem in that the molecular sieve framework is not sufficiently modified so that the hydrothermal stability of the modified molecular sieve becomes poor.

As described above, U.S. Pat. No. 6,211,104 discloses a catalyst for catalytic cracking, which comprises 10-70 wt % clay, 5-85 wt % inorganic oxides and 1-50 wt % zeolite. The zeolite used in the catalyst of said patent comprises 0-25 wt % Y-zeolite or REY-zeolite and 75-100 wt % pentasil zeolite ($SiO_2/Al_2O_3$=15-60; selected from ZSM-5, ZSM-8 and ZSM-11 zeolites containing 2-8 wt % $P_2O_5$ and 0.3-3 wt % $Al_2O_3$ or MgO or CaO), in which the starting materials of said aluminum, magnesium and calcium compounds are selected from aqueous solutions of their nitrates, hydrochloride or sulfates. However, in said patent, examples of the added metal are limited to Al, Mg and Ca, indicating that said patent fails to sufficiently elucidate the role of phosphorus as described in the present invention. Also, due to the use of conventional water-soluble salts as the starting materials of these metals, the Al, Mg or Ca cations, which are generated during a preparation process of the catalyst, can be easily ion-exchanged with the protons of zeolite, resulting in the loss of acidic sites. For this reason, it cannot be shown that the catalyst disclosed in said patent is one where the surface pores of the molecular sieve are selectively modified and stabilized, as in the case of the present inventive catalyst.

Meanwhile, the inventive porous catalyst as described above is useful as a catalyst for heterogeneous catalytic reactions, such as various oxidation/reduction reactions, including catalytic cracking reactions, isomerization reactions, alkylation reactions and esterification reactions, where the hydrothermal stability of the catalyst in a severe environment of high temperature and humidity is required. In particularly, the inventive catalyst is useful as a catalyst for a catalytic cracking reaction, where hydrothermal stability of the catalyst in a severe environment of high temperature and humidity is required.

Regarding the evaluation of hydrothermal stability for the porous molecular sieve catalyst according to the present invention, even when the catalyst is steamed, for example, in an atmosphere of 100% steam at 750° C. for 24 or more hours, preferably, 24-30 hours, the catalyst will be stable in terms of its structure and performance, indicating that it still shows excellent catalytic activity. In particular, if the inventive molecular sieve catalyst steamed under the above-described atmosphere is used in, for example, a catalytic cracking reaction process, the content of light olefins (ethylene+propylene) in the effluent of the reaction zone will preferably be more than about 30 wt %, more preferably more than about 35 wt %, and most preferably about 37 wt %, indicating excellent selectivity to light olefins. In this case, the ethylene/propylene weight ratio is about 0.7-1.2, indicating that propylene is produced in a relatively large amount.

As described above, according to the present invention, the hydrothermally stable porous molecular sieve catalyst, which is highly required in a reaction involving water, can be provided by this particular method. Also, a porous molecular sieve catalyst, which maintains its hydrothermal stability even in an atmosphere of high temperature and humidity, can be provided by modifying only exposed acid sites outside the pores of the porous molecular sieve catalyst with a hydrothermally stable phosphate ion species, with the phosphate ion species being also stabilized with metal ions by the addition of the water-insoluble metal salt.

Hereinafter, the present invention will be described in more detail using examples. It is to be understood, however, that these examples are not to be construed to limit the scope of the present invention.

EXAMPLE 1

(1) 9.58 g of concentrated phosphoric acid (85% $H_3PO_4$) was dissolved in 200 mL of distilled water. To the solution, 3.35 g of MgO was slowly added with stirring for about 20 minutes. Next, the solution was stirred at about 40° C. for about 1 hour and then stirred at about 60° C. until the water completely evaporated. The resulting solid product was washed, filtered and separated.

(2) To 200 mL of distilled water, 1.94 g of HZSM-5 (Zeolyst) with a Si/Al molar ratio of 25 and 0.06 g of the solid product prepared in step (1) were added. The mixture solution was stirred at 50-60° C. for about 5 hours, and the stirred solution was vacuum filtered, washed and separated, thus preparing a Mg—HPO-HZSM-5 catalyst.

EXAMPLE 2

(1) 19.68 g of concentrated phosphoric acid (85% $H_3PO_4$) was dissolved in 100 mL of distilled water. To the solution, 4.78 g of $Mg(OH)_2$ was slowly added with stirring for about 20 minutes. Next, the solution was stirred at about 40° C. for about 1 hour and then stirred at about 60° C. until the water completely evaporated. The resulting solid product was washed, filtered and separated.

(2) To 100 mL of distilled water, 1.94 g of HZSM-5 (Zeolyst) with a Si/Al molar ratio of 25 and 0.06 g of the solid product prepared in step (1) were added. The mixture solution was stirred at 50-60° C. for about 5 hours, and the stirred solution was vacuum filtered, washed and separated, thus preparing a Mg—$H_2PO_4$-HZSM-5 catalyst.

EXAMPLE 3

(1) 17.5 g of concentrated phosphoric acid ($H_3PO_4$) was dissolved in 100 mL of distilled water. To the solution, 13.31 g of $Mg(OH)_2$ was slowly added with stirring for about 20 minutes. Next, the solution was stirred at about 40° C. for 1 hour and then stirred at about 60° C. until the water completely evaporated. The resulting solid product was washed, filtered and separated.

(2) To 100 mL of distilled water, 1.94 g of HZSM-5 (Zeolyst) having a Si/Al molar ratio of 25 and 0.06 g of the solid product prepared in step (1) were added. The mixture solution was stirred at 50-60° C. for about 5 hours, and the stirred solution was vacuum filtered, washed and separated, thus preparing a Mg—$PO_4$-HZSM-5 catalyst.

EXAMPLE 4

To 100 mL of distilled water, 0.30 g of concentrated phosphoric acid (85% $H_3PO_4$) was added, followed by stirring for 20 minutes. To the solution, 0.15 g of $Mg(OH)_2$ was added, and the mixture solution was adjusted to a pH of 7.2 using ammonia water, followed by stirring at 45° C. for about 1 hour. Then, 10 g of ferrierite (Zeolyst) having a Si/Al molar ratio of 10 was added to the mixture, followed by stirring for 1 hour. The mixture solution was stirred at about 70° C. until the water completely evaporated. Then, vacuum filtration was performed to separate the solid product, thus preparing a Mg—$HPO_4$-HFER-5 catalyst.

EXAMPLES 5-6

Catalysts were prepared in the same manner as in Example 4 except that the composition of the raw material mixture was changed as shown in Table 1 below.

EXAMPLE 7

To 100 ml of distilled water, 0.18 g of concentrated phosphoric acid (85% $H_3PO_4$) was added and stirred for 20 minutes. To the solution, 0.15 g of $BaCO_3$ was added, and the mixture was adjusted to a pH of 2-3 using aqueous nitric acid solution and stirred at about 50° C. for about 1 hour. To the stirred solution, 10 g of HZSM-5 (Zeolyst) having a Si/Al molar ratio of 25 was added, followed by stirring for 1 hour. Then, the resulting material was stirred at about 60° C. until the water completely evaporated, thus preparing a Ba—$H_2PO_4$-HZSM-5 catalyst.

EXAMPLES 8-9

Catalysts were prepared in the same manner as in Example 4 except that the composition of the raw material mixture was changed as shown in Table 1 below.

COMPARATIVE EXAMPLE 1

10 g of HZSM-5 (Si/Al=25; Zeolyst) was calcined in air at about 500° C. for 5 hours, thus preparing an HZSM-5 catalyst.

COMPARATIVE EXAMPLE 2

To 100 mL of distilled water, 10 g of HZSM-5 (Si/Al=25; Zeolyst) and 0.74 g of concentrated phosphoric acid (85% $H_3PO_4$) were added, followed by stirring for about 20 minutes. To the stirred solution, 1.40 g of $La(NO_3)_3.xH_2O$ was added, and the mixture was adjusted to a pH of 7-8 and stirred at about 45° C. for about 20 minutes. After stirring the mixture at about 50° C. until the water completely evaporated, vacuum filtration was performed to separate the solid product, thus preparing a La—$H_3PO_4$-HZSM-5 catalyst.

COMPARATIVE EXAMPLE 3

A catalyst was prepared according to the method disclosed in U.S. Pat. No. 6,211,104. The catalyst was prepared in the following manner. To 40 g of a solution of 85% phosphoric acid and $MgCl_2.6H_2O$ in distilled water, 20 g of $NH_4$-ZSM-5 was added, and then stirred to load the molecular sieve with the phosphoric acid and metal salt. Then, the resulting material was dried in an oven at 120° C.

TABLE 1

| | Composition (wt %) | | | |
|---|---|---|---|---|
| | Zeolites | Alkaline earth metal salts | Transition/ heavy metal salts | Phosphate species |
| Example 1 | HZSM-5 | MgO (1.5) | — | $HPO_4$ (1.5) |
| Example 2 | HZSM-5 | $Mg(OH)_2$ (1.5) | — | $H_2PO_4$ (1.5) |
| Example 3 | HZSM-5 | $Mg(OH)_2$ (1.5) | — | $PO_4$ (1.5) |
| Example 4 | ferrierite | $Mg(OH)_2$ (1.4) | — | $HPO_4$ (2.4) |
| Example 5 | HZSM-5 | $Ca(C_2O_4)$ (1.5) | — | $HPO_4$ (1.5) |
| Example 6 | HZSM-5 | — | $Ce_2O_3$ (2.0) | $HPO_4$ (2.0) |
| Example 7 | HZSM-5 | $BaCO_3$ (1.5) | — | $H_2PO_4$ (1.3) |
| Example 8 | HZSM-5 | — | $La_2O_3$ (1.7) | $HPO_4$ (1.7) |
| Example 9 | HZSM-5 | — | $Fe(C_2O_4)$ (2.0) | $HPO_4$ (2.0) |
| Comparative Example 1 | HZSM-5 | — | — | — |
| Comparative Example 2 | HZSM-5 | — | $La(NO_3)_{3}.xH_2O$ (6.0) | $HPO_4$ (2.0) |
| Comparative Example 3 | HZSM-5 | $MgCl_2.6H_2O$ (3.0) | — | P (3.0) |

<Evaluation of Hydrothermal Stability>

Figure 1B:
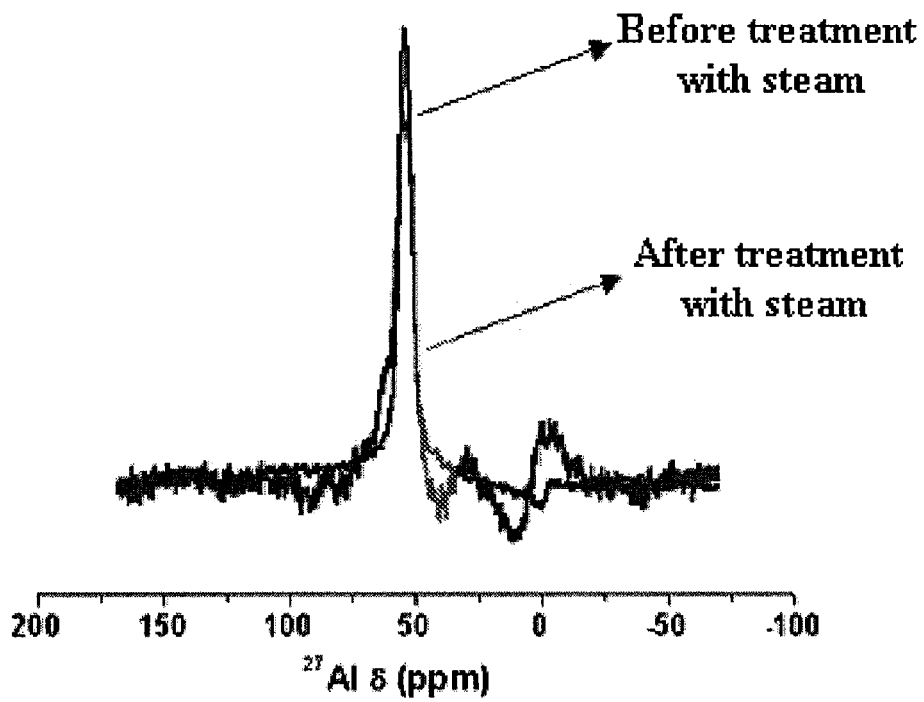
Figure 1C:
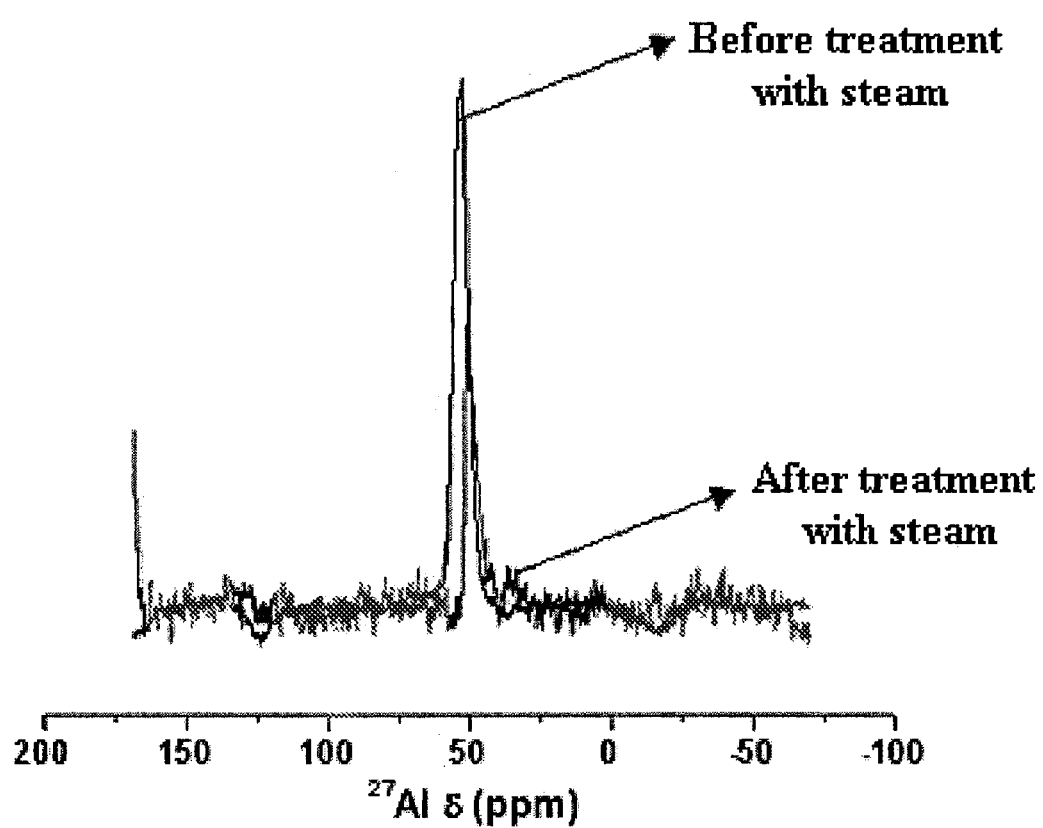

To evaluate the hydrothermal stability of the catalysts prepared in Example 3 and Comparative Examples 1 and 3, $^{27}$Al NMR spectra of the catalysts were measured before and after treatment with steam, and the results are shown in FIGS. 1A to 1C (FIG. 1A: Example 3; FIG. 1B: Comparative Example 1; and FIG. 1C: Comparative Example 3). In this regard, the steam treatment was carried out in an atmosphere of 100% steam at 750° C. for 24 hours.

As shown in FIGS. 1A to 1C, the stabilities before and after steam treatment were different between the catalysts prepared in Example and Comparative Examples. Namely, the catalyst prepared in Example 3 of the present invention showed little or no change in the location and size of a tetrahedral Al peak at about 55 ppm even when it was steamed in an atmosphere of high temperature and humidity (i.e., maintained in an atmosphere of 100% steam at 750° C. for 24 hours), indicating that the tetrahedral structure remained intact after the steam treatment. This suggests that, due to the modification method suggested in the present invention, the structure of Al is stably maintained even in a severe atmosphere.

On the other hand, the catalyst of Comparative Example 1 showed a tetrahedral Al peak at about 55 ppm before steam treatment, it could be observed that not only was the intensity of the Al peak at about 55 ppm decreased to a level of about 82%, but Al peaks at about 30 ppm and 0 ppm, which are expected to have pentagonal and octahedral structures, respectively, were also produced. This suggests that some Al chemical species having a tetrahedral structure were changed to other structures, leading to a remarkable reduction in stability.

Also, the hydrothermal stability of the catalyst of Comparative Example 3 prepared according to the method described in U.S. Pat. No. 6,211,104 was examined and as a result, it could be observed that, before steam treatment, the catalyst showed a tetrahedral Al peak at 55 ppm, but after steam treatment, the peak intensity was decreased to a level of about 50%, suggesting that some Al chemical species having an unstable tetrahedral structure were lost, resulting in a reduction in hydrothermal stability.

Figure 2:
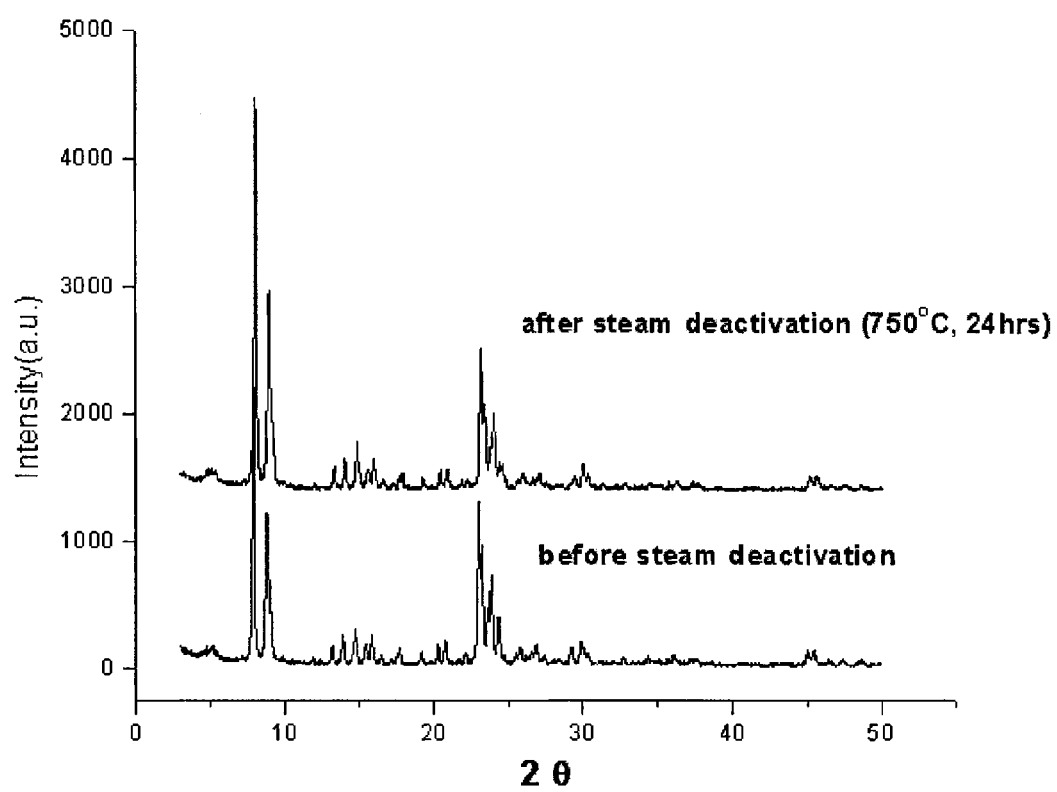
FIG. 2 is a graphic diagram showing the result of X-ray diffraction patterns for Example 3 of the present invention.

To evaluate the hydrothermal stability of the catalyst prepared in Example 3, the catalyst was measured for X-ray diffraction patterns before and after steam treatment, and the results are shown in FIG. 2. In this regard, the steam treatment was carried out in an atmosphere of 100% steam at 750° C. for 24 hours.

As could be seen in FIG. 2, the catalyst prepared according to Example 3 showed almost similar X-ray diffraction patterns before and after the steam treatment. In other words, the catalyst of Example 3 according to the present invention maintained the framework structure of the molecular sieve intact even when it was steamed in an atmosphere of high temperature and humidity (maintained in an atmosphere of 100% steam at 750° C. for 24 hours). This suggests that, by the modification method disclosed in the present invention, the structure of the molecular sieve having a framework of —Si—OH—Al— groups is stably maintained even in a severe atmosphere.

<Evaluation of Catalytic Activity>

Figure 3:
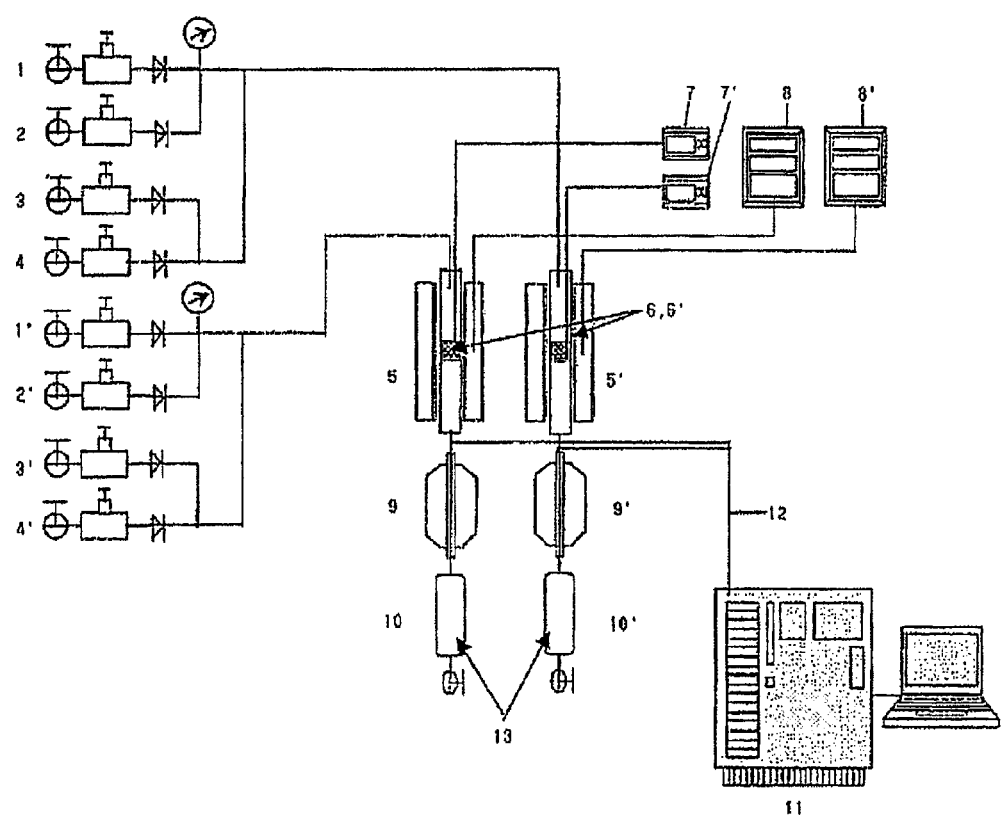
FIG. 3 schematically shows a system for measuring the performance of catalysts prepared according to Examples of the present invention and Comparative Examples.

As shown in FIG. 3, a system for measuring the activity of a catalyst comprises a naphtha feed device 4, a water feed device 3, fixed-bed reactors 5 and 5', and an activity evaluation device, which are integrally connected with each other. In this regard, naphtha, specified in Table 2 above, was used as feedstock. Naphtha and water fed by a liquid injection pump were mixed with each other in a preheater (not shown) at 300° C., and mixed with 6 ml/min of He and 3 ml/min of N$_2$ fed by helium feed devices 2 and 2' and nitrogen feed devices 1 and 1', respectively, and the mixture was fed into the fixed-bed reactors 5 and 5'. In this regard, the amount and rate of each gas were controlled with a flow controller (not shown). The fixed-bed reactors are divided into an inner reactor and an outer reactor, in which the outer reactor, an Inconel reactor, was manufactured to a size of 38 cm in length and 4.6 cm in outer diameter, and the inner reactor made of stainless steel was manufactured to a size of 20 cm in length and 0.5 inches in outer diameter. The temperature within the reactors was indicated by temperature output devices 7 and 7', and reaction conditions were controlled by PID controllers (8 and 8' NP200; Han Young Electronics Co., Ltd, Korea).

The gas fed into the reactors was passed through the inner reactor and then passed through the outer reactor, through which He flowed at 40 ml/min. The bottom of the inner reactor was filled with the catalyst. The mixed gas was catalytically cracked by the catalyst layers 6 and 6', and after the reaction, vapor phase product 12 was quantified online by gas chromatography 11 (Model: HP 6890N). The remaining liquid phase product 13 passed through condensers 9 and 9' was recovered into storage tanks 10 and 10' and then quantified by gas chromatography (Model: DS 6200; not shown). The amount of the catalyst used in the catalytic cracking reaction was 0.5 g, the feeding rate of each of naphtha and water was 0.5 g/h, and the reaction was carried out at 675° C.

The obtained results for conversion, selectivity to light olefins (ethylene+propylene) in the reaction product, and the ethylene/propylene weight ratio are shown in Table 3 below.

TABLE 2

| | n-paraffin | i-paraffin | naphthene | aromatics | olefins |
|---|---|---|---|---|---|
| Naphtha | 31.7% | 53.0% | 9.3% | 2.7% | 3.3% |

TABLE 3

| | Catalytic cracking reaction results (unit: wt %) | | | | |
|---|---|---|---|---|---|
| | Conversion | C2$^=$ | C3$^=$ | C2$^=$+C3$^=$ | C2$^=$/C3$^=$ |
| Example 1 | 76.8 | 18.1 | 19.4 | 37.5 | 0.93 |
| Example 2 | 77.0 | 16.3 | 18.0 | 34.3 | 0.90 |
| Example 3 | 76.2 | 16.2 | 17.8 | 34.0 | 0.91 |
| Example 4 | 76.8 | 14.8 | 18.6 | 33.4 | 0.80 |
| Example 5 | 80.1 | 18.0 | 17.7 | 35.7 | 1.01 |
| Example 6 | 76.0 | 16.6 | 18.5 | 35.1 | 0.90 |
| Example 7 | 79.2 | 16.7 | 19.6 | 36.3 | 0.85 |
| Example 8 | 80.4 | 17.4 | 18.5 | 35.9 | 0.94 |
| Example 9 | 79.7 | 17.4 | 19.7 | 37.1 | 0.89 |
| Comparative Example 1 | 67.7 | 10.8 | 13.7 | 24.5 | 0.79 |
| Comparative Example 2 | 75.4 | 13.1 | 17.4 | 30.5 | 0.75 |
| Comparative Example 3 | | 13.6 | 16.3 | 29.9 | 0.83 |

As can be seen in Table 3, the reactivity of the catalyst was different between the catalysts prepared according to Examples and Comparative Examples. Namely, the catalysts of Examples 1-9 according to the present invention showed high conversion of about 76-80 wt % and at the same time, high selectivity corresponding to the sum of ethylene+propylene of about 33-37 wt % (ethylene/propylene weight ratio =about 0.8-1.0), even when they were steamed in an atmosphere of high temperature and humidity (maintained in an atmosphere of 100% steam at 750° C. for 24 hours).

On the other hand, the catalyst of Comparative Example 1 showed a conversion of 67.7 wt % and a sum of ethylene+propylene of 24.5 wt %, suggesting poor catalytic activity. The catalyst of Comparative Example 2 showed a conversion of 75.4 wt % and a sum of ethylene+propylene of 30.5. These results can be seen to be inferior to those of Examples 1-9, and this is believed to because nitric acid salt, which is a water-soluble metal salt but not a water-insoluble salt, was used. Also, the catalyst (Comparative Example 3) prepared according to the method described in U.S. Pat. No. 6,211,104 B1 was evaluated for reaction activity, and the evaluation result was inferior to that of the present inventive catalyst.

As described above, the catalyst according to the present invention showed $C2^==+C3^==33-37\%$ even when it was hydrothermally treated in an atmosphere of 100% steam at 750° C. for 24 hours, whereas HZSM-5, P-HZSM-5 and La-HZSM-5 catalysts showed $C2^==+C3^==23-24\%$, and La—P-HZSM-5 showed $C2^==+C3^==$ about 30%. Also, the inventive catalyst shows a characteristic in that it is possible to control the hydrothermal stability of the catalyst, conversion, and the $C2^=/C3^=$ ratio by adjusting the component and composition ratio of the chemical species used for modifying the catalyst. In addition, the inventive catalyst is excellent in reaction activity required in producing light olefins from naphtha containing $C_{2-12}$ hydrocarbons.

As described above, the porous molecular sieve catalyst according to the present invention is a cost-effective composition capable of substituting for known conventional solid acid catalysts. In particular, even when it is hydrothermally treated in an atmosphere of high temperature and humidity, it will have a relatively stable structure and maintain catalytic activity for a long period of time.

Because the inventive catalyst is physically and chemically stable even in an atmosphere of high temperature and humidity as described above, it is expected that the catalyst will show excellent catalytic activity when it is used in heterogeneous catalytic reactions, such as various oxidation/reduction reactions, including catalytic cracking reactions, isomerization reactions, alkylation reactions and esterification reactions.

In addition, the inventive catalyst is expected to be highly useful in that a reaction involved in catalyst preparation will be relatively simple, and the cost required for raw materials for preparing the catalyst can be lowered.

Although the preferred embodiments of the present invention have been described for illustrative purposes, those skilled in the art will appreciate that simple modifications, additions, and substitutions are possible, without departing from the scope and spirit of the invention as disclosed in the accompanying claims.

What is claimed is:

1. A hydrothermally stable porous molecular sieve catalyst, which consists of a product obtained by the evaporation of water from a raw material mixture comprising 100 parts by weight of a molecular sieve having a framework of —Si—OH—Al—, 0.0 1-5.0 parts by weight of a water-insoluble metal salt, and 0.05-17.0 parts by weight of a phosphate compound selected from a group consisting of phosphoric acid ($H_3PO_4$), ammoniunm phosphate and alkyl phosphate; in which surface pores of the molecular sieve are modified with one of compounds represented by following formulas 1 to 3:

[Formula 1]
$M_x(H_2PO_4)_y$, wherein M is a metal, x is 1, and y is an integer from 2 to 6;

[Formula 2]
$M_x(HPO_4)_y$, wherein M is a metal, x is 2, and y is an integer from 2 to 6; and

[Formula 3]
$Mx(PO_4)_y$, wherein M is a metal, x is 3, and y is an integer from 2 to 6.

2. The catalyst of claim 1, wherein a molar ratio of the water-insoluble metal salt to the phosphate compound is 1.0: 0.3-10.0.

3. The catalyst of claim 1, wherein the molecular sieve is a zeolite having a Si/Al molar ratio of 1-300 and a pore size of 4-10 Å, or a mesoporous molecular sieve having a pore size of 10-100 Å.

4. The catalyst of claim 3, wherein the molecular sieve is selected from a group consisting of ZSM-5, Ferrierite, ZSM-11, Mordenite, Beta-zeolite, MCM-22, L-zeolite, MCM-41, SBA-15 and Y-zeolite.

5. The catalyst of claim 1, wherein the water-insoluble metal salt is an oxide, hydroxide, carbonate or oxalate of at least one metal selected from a group consisting of alkaline earth metals, transition metals, and heavy metals having an oxidation state of +3 to +5.

6. A method for preparing a hydrothermally stable porous molecular sieve catalyst, the method comprising the steps of:
(a) mixing a phosphate compound selected from a group consisting of phosphoric acid, ammonium phosphate and alkyl phosphate, a water-insoluble salt and water with each other to prepare the aqueous slurry which has a raw material composition comprising 100 parts by weight of the molecular sieve, 0.01-5.0 parts by weight of the water-insoluble metal salt and 0.05-17.0 parts by weight of the phosphate compound;
(b) adjusting a pH of the slurry such that the phosphate compound in the slurry is present as an ion selected from among a monohydrogen phosphate ion ($[HPO_4]^{2-}$), a dihydrogen phosphate ion ($[H_2PO_4]^-$) and a phosphate ion ($[PO_4]^{3-}$), and stirring the slurry;
(c) adding the molecular sieve having a framework of —Si—OH—Al— to the slurry of step (b); and
(d) removing water from the aqueous slurry by an evaporation process, followed by filtration to collect the solid product.

7. The method of claim 6, wherein a molar ratio of the water-insoluble metal salt to the phosphate compound is 1.0: 0.3-10.0.

8. The method of claim 6, wherein the stirring in step (b) is carried out at a temperature of 20-60° C. for a period ranging from 30 minutes to 3 hours.

9. The method of claim 6, wherein the evaporation process in step (d) is carried out at a temperature of 10-90° C.

10. The method of claim 6, wherein the molecular sieve is a zeolite having a Si/Al molar ratio of 1-300 and a pore size of 4-10 Å, or a mesoporous molecular sieve having a pore size of 10-100 Å.

11. The method of claim 10, wherein the molecular sieve is selected from a group consisting of ZSM-5, Ferrierite, ZSM-11, Mordenite, Beta-zeolite, MCM-22, L-zeolite, MCM-41, SBA-15 and Y-zeolite.

12. The catalyst of claim 6, wherein the water-insoluble metal salt is an oxide, hydroxide or carbonate of at least one metal selected from a group consisting of alkaline earth metals, transition metals, and heavy metals having an oxidation state from +3 to +5.

13. A method for preparing a hydrothermally stable porous molecular sieve catalyst, the method comprising the steps of:
- (a) mixing a phosphate compound selected from a group consisting of phosphoric acid, ammonium phosphate and alkyl phosphate, the water-insoluble metal salt and water with each other to prepare the aqueous slurry;
- (b) adjusting a pH of the mixture such that the phosphate compound in a resultant mixture is present as an ion selected from a monohydrogen phosphate ion, a dihydrogen phosphate ion and a phosphate ion, and stirring the mixture
- (c) removing water from the aqueous slurry through a first evaporation process, followed by filtration to collect a first solid product;
- (d) preparing an aqueous slurry containing a molecular sieve having a framework of —Si—OH—Al—; and
- (e) adding the first solid product to the molecular sieve-containing aqueous slurry, and removing water from a resultant mixture solution through a second evaporation process, followed by filtration to separate a second solid product;

in which the phosphate compound and the water-insoluble metal salt are used in amounts of 0.05-17.0 parts by weight and 0.01-5.0 parts by weight, respectively, based on 100 parts by weight of the molecular sieve.

14. The method of claim 13, wherein a molar ratio of the water-insoluble metal salt to the phosphate compound is 1.0:0.3-10.0.

15. The method of claim 13, wherein the first solid product is added in an amount of 0.01-20.0 parts by weight, based on 100 parts by weight of the molecular sieve.

16. The method of claim 13, wherein mixing in step (b) is carried out at a temperature of 20-60° C. for a period ranging from 30 minutes to 3 hours.

17. The method of claim 13, wherein the first evaporation process is carried out at a temperature of 10-90° C.

18. The method of claim 13, wherein the second evaporation process is carried out at a temperature of 20-60° C.

19. The method of claim 13, wherein the molecular sieve is a zeolite having a Si/Al molar ratio of 1-300 and a pore size of 4-10 Å, or a mesoporous molecular sieve having a pore size of 10-100 Å.

20. The method of claim 13, wherein the water-insoluble metal salt is an oxide, hydroxide or carbonate of at least one metal selected from a group consisting of alkaline earth metals, transition metals, and heavy metals having an oxidation state from +3 to +5.

\* \* \* \* \*